United States Patent
Lee et al.

(10) Patent No.: US 9,556,855 B2
(45) Date of Patent: Jan. 31, 2017

(54) DOUBLE FLOW CHANNEL OPEN-TYPE SOLAR HEAT ABSORBER HAVING POROUS PLATE ARRANGEMENT

(71) Applicant: KOREA INSTITUTE OF ENERGY RESEARCH, Daejeon (KR)

(72) Inventors: Sang Nam Lee, Daejeon (KR); Jong Kyu Kim, Daejeon (KR); Hyun Jin Lee, Daejeon (KR); Yong Heack Kang, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 14/442,703

(22) PCT Filed: Nov. 14, 2012

(86) PCT No.: PCT/KR2012/009604
§ 371 (c)(1),
(2) Date: May 13, 2015

(87) PCT Pub. No.: WO2014/077423
PCT Pub. Date: May 22, 2014

(65) Prior Publication Data
US 2015/0345481 A1    Dec. 3, 2015

(51) Int. Cl.
*F03G 6/06* (2006.01)
*F24J 2/24* (2006.01)
(Continued)

(52) U.S. Cl.
CPC .................. *F03G 6/065* (2013.01); *F24J 2/07* (2013.01); *F24J 2/242* (2013.01); *F24J 2/28* (2013.01);
(Continued)

(58) Field of Classification Search
CPC ........ F03G 6/065; F03G 2006/008; F24J 2/07; F24J 2/242; F24J 2/28; Y02E 10/41; Y02E 10/44; Y02E 10/46
(Continued)

(56) References Cited

U.S. PATENT DOCUMENTS 3,927,659 A * 12/1975 Blake ........................ F22B 1/00
                                                               126/643
4,019,868 A *  4/1977 Sebacher ................ C01B 3/045
                                                               422/208
(Continued)

FOREIGN PATENT DOCUMENTS

KR    10-2002-0055870 A    7/2002
KR        10-0895972 B1    5/2009

*Primary Examiner* — Thomas Denion
*Assistant Examiner* — Shafiq Mian
(74) *Attorney, Agent, or Firm* — Novick, Kim & Lee, PLLC; Jae Youn Kim

(57) ABSTRACT

The present invention relates to a dual-passage open-type solar heat absorber having a porous plate array, and more particularly, to a dual-passage open-type solar heat absorber which is formed in a form of a rectangular-shaped container in order to increase a contact area with collected sunlight and easily extend in a lateral direction or in a form of a circular-shaped container which is advantageous when a pressure is applied thereto, and which includes a main body formed in a formed of a rectangular or circular-shaped container by using a three-layered tube to form a dual passage therein so that heat is prevented from being lost through an outer wall.

4 Claims, 3 Drawing Sheets

(51) Int. Cl.
*F24J 2/07* (2006.01)
*F24J 2/28* (2006.01)
*F03G 6/00* (2006.01)

(52) U.S. Cl.
CPC .......... *F03G 2006/008* (2013.01); *Y02E 10/41* (2013.01); *Y02E 10/44* (2013.01); *Y02E 10/46* (2013.01)

(58) Field of Classification Search
USPC ...................................................... 60/641.11
See application file for complete search history.

(56) References Cited

U.S. PATENT DOCUMENTS

| | | | | |
|---|---|---|---|---|
| 4,033,118 A * | 7/1977 | Powell | F24J 2/07 | 60/641.15 |
| 4,121,564 A * | 10/1978 | Schwartz | F03G 6/064 | 126/684 |
| 4,131,785 A * | 12/1978 | Shutt | F24H 1/208 | 122/33 |
| 4,135,489 A * | 1/1979 | Jarvinen | F24J 2/07 | 126/648 |
| 4,148,300 A * | 4/1979 | Kaufman, Sr. | F24J 2/06 | 126/684 |
| 4,205,655 A * | 6/1980 | Hunt | F24J 2/055 | 126/635 |
| 4,263,895 A * | 4/1981 | Colao | F24J 2/07 | 126/586 |
| 4,479,485 A * | 10/1984 | McDougal | F24J 2/07 | 126/648 |
| 4,598,695 A | 7/1986 | Niggemann | | |
| 5,421,322 A * | 6/1995 | Karni | B01J 19/122 | 126/680 |
| 5,931,158 A * | 8/1999 | Buck | F24J 2/07 | 126/648 |
| 6,003,508 A * | 12/1999 | Hoffschmidt | F03G 6/00 | 126/674 |
| 7,074,370 B2 * | 7/2006 | Segal | B01D 53/945 | 204/177 |
| 8,978,642 B2 * | 3/2015 | Stettenheim | F24J 2/055 | 126/666 |
| 2002/0083946 A1 * | 7/2002 | Karni | F24J 2/07 | 126/648 |
| 2005/0210876 A1 * | 9/2005 | Karni | F24J 2/07 | 60/641.15 |
| 2010/0199975 A1 * | 8/2010 | Bailey | F24D 3/105 | 126/617 |
| 2014/0075940 A1 * | 3/2014 | Wang | F24J 2/07 | 60/641.14 |

* cited by examiner

DOUBLE FLOW CHANNEL OPEN-TYPE SOLAR HEAT ABSORBER HAVING POROUS PLATE ARRANGEMENT

TECHNICAL FIELD

The present invention relates to a dual-passage open-type solar heat absorber having a porous plate array, and more particularly, to a dual-passage open-type solar heat absorber which is formed in a form of a container having a rectangular or circular-shaped cross section in order to increase a contact area with collected sunlight and easily extend in a lateral direction, and which includes a main body formed by using a three-layered tube to form a dual passage therein so that heat is prevented from being lost through an outer wall. In addition, the dual passage has a structure in which a heat transfer medium is introduced into an inner passage through an outer passage so that a real heat exchange is performed in the inner passage. The heat transfer medium is preheated in the heat transfer medium by residual heat discharged from the inner passage along the outer wall, so that the heat loss due to the discharge of heat along the outer wall may be minimized, and in the inner passage, a plurality of porous plates and baffles are installed sequentially and repeatedly, so that the heat-exchange surface area and passage may extend thereby to increase the heat-exchange efficiency.

BACKGROUND ART

As fossil fuel has been exhausted, many power generation apparatus using natural power have been developed. As one example of the power generation apparatus, there is a power generation apparatus using solar heat. The power generation apparatus using solar heat includes a solar heat power generation system. As one example of solar heat power generation system, there is a tower-type solar heat power generation system.

The tower-type solar heat power generation system includes several heliostats for tracking the sun, and reflecting and collecting sunlight to be focused onto a place, a receiver for absorbing the energy of the collected solar heat to transfer the energy to a heat transfer medium, a steam generator for generating steam by using the heat of the heat transfer medium heated in the receiver, and a steam turbine for generating electricity by using the steam generated from the steam generator.

In the tower-type solar heat power generation system, the heat transfer medium passing through the receiver is heated by the heat collected by the heliostats. The heat transfer medium heated up to about 1,000 degrees in the receiver is transferred to the steam generator, so that the steam generator generates saturated or over-heated steam. In this case, the generated steam is transferred to the steam turbine to generate power.

In the tower-type solar heat power generation system, if air serves as the heat transfer medium, the air used in the steam generator may return again to the receiver through a fan. For the purpose of preparing for the reduction of radiation energy of the sun as an energy source, the heat energy may be stored in a heat storage tank. That is, the tower-type solar heat power generation system includes a heliostat, a tower, a storage, a turbine, a generator, a condenser, and a deaerator As shown in FIG. 5, the tower and air-type receiver according to the prior art includes a plurality of receiver modules 2 installed at a front end of the receiver 1 to suck external air through an inner suction fan. The receiver module 2 is heated at a high temperature when the sunlight reflected upon the heliostat is collected. In this case, when the inner suction fan is driven, external air is introduced along a fine passage of the receiver module 2 therein. Then, the introduced external air makes a heat exchange with the receiver module while passing through the receiver module, so that the temperature of the introduced external air is raised to a high temperature, Thus, steam is generated by using the external air heated at the high temperature, so that electric power may be generated.

However, since the absorber according to the prior art has a rear portion which is exposed to an outside or directly connected to a support and is insufficient to transfer solar heat, so that the rear portion has relatively lower temperature than a front portion thereof. Thus, there is a problem that causes the high-temperature air passing through the receiver module to make a heat re-exchange through a wall surface of the rear portion of the absorber, thereby losing heat.

Therefore, there is a need to study an absorber having a structure capable of minimizing the heat loss due to the heat re-exchange at the rear portion of the absorber.

DISCLOSURE

Technical Problem

An object of the present invention is to provide a dual-passage open-type solar heat absorber having a porous plate array which is formed in a form of a container having a rectangular or circular-shape in order to improve expandability in a lateral direction, and which includes a wall surface having a dual-layered dual passage formed by using a three-layered tube in order to allow a heat-exchange medium to be introduced into a lower passage to make a heat exchange after the heat-exchange medium is primarily introduced into an upper passage to form a heat blocking curtain, such that heat loss through the side wall is minimized.

In addition, another object of the present invention is to increase a length of the inner passage and a heat-exchange area by alternatively installing porous plates and baffles in the inner passage of the dual passage.

Technical Solution

To achieve the above objects, according to present invention, there is provided a dual-passage open-type absorber having a porous plate array which allows a heat-exchange medium to absorb solar heat in a tower-type solar heat generation system, wherein the heat-exchange medium is heated by a sunlight reflected by a heliostat and steam is generated by the heated heat-exchange medium to generate electricity. The dual-passage open-type absorber includes a side wall formed with a three-layered tube having an inner tube, an intermediate tube and an outer tube which have a rectangular or circular shape and overlap each other, wherein a plurality of through-holes are formed in a side surface of a rear end of the inner tube, side surfaces of the inner, intermediate and outer tubes are spaced apart from each other to form outer and inner passages, which communicate with each other through a front end of the inner tube; a front finish plate in a form of a strip plate provided at a front end of the side wall and coupled to ends of the inner and outer tubes to close the end of the three-layered tube; a rear finish plate for closing an entire rear end of the side wall; an inner finish plate for closing an inside of the inner tube at a position spaced to the front end from the rear finish plate by a predetermined distance such that a collection space is formed between the inner finish plate and the rear finish plate and a plurality of through-holes formed in a side surface of the inner tube are placed in the collection space; an inlet tube coupled to the rear finish plate to communicate with the outer passage; and an outlet tube coupled to the rear finish plate to communicate with the collection space.

BEST MODE

Mode for Invention

Hereinafter, the present invention will be described in more detail with reference to accompanying drawings.

Figure 1A:
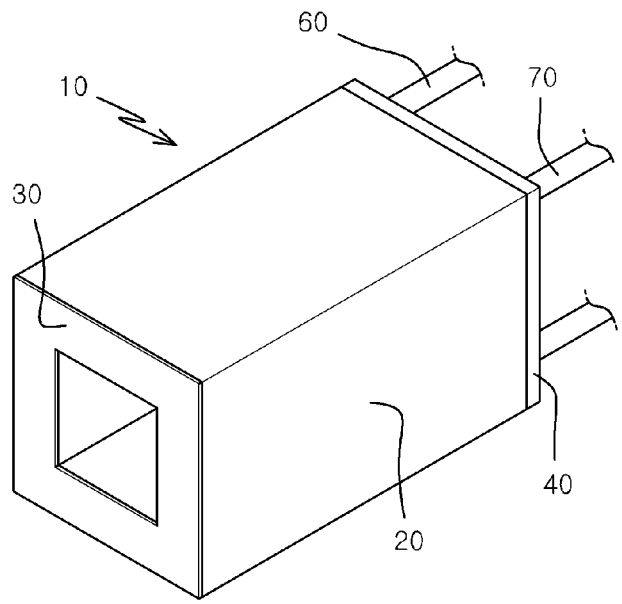
FIGS. 1A, 1B, and 2 are perspective exploded views illustrating an open-type solar heat absorber having a dual passage according to an embodiment of the present invention.
Figure 1B:
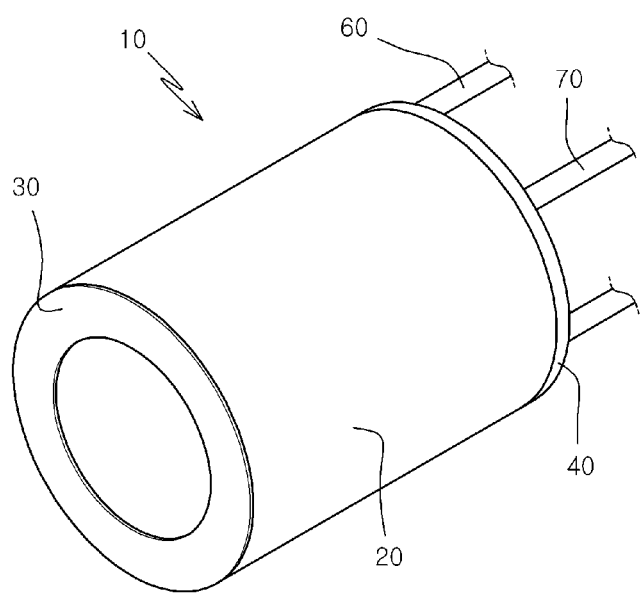
Figure 2:
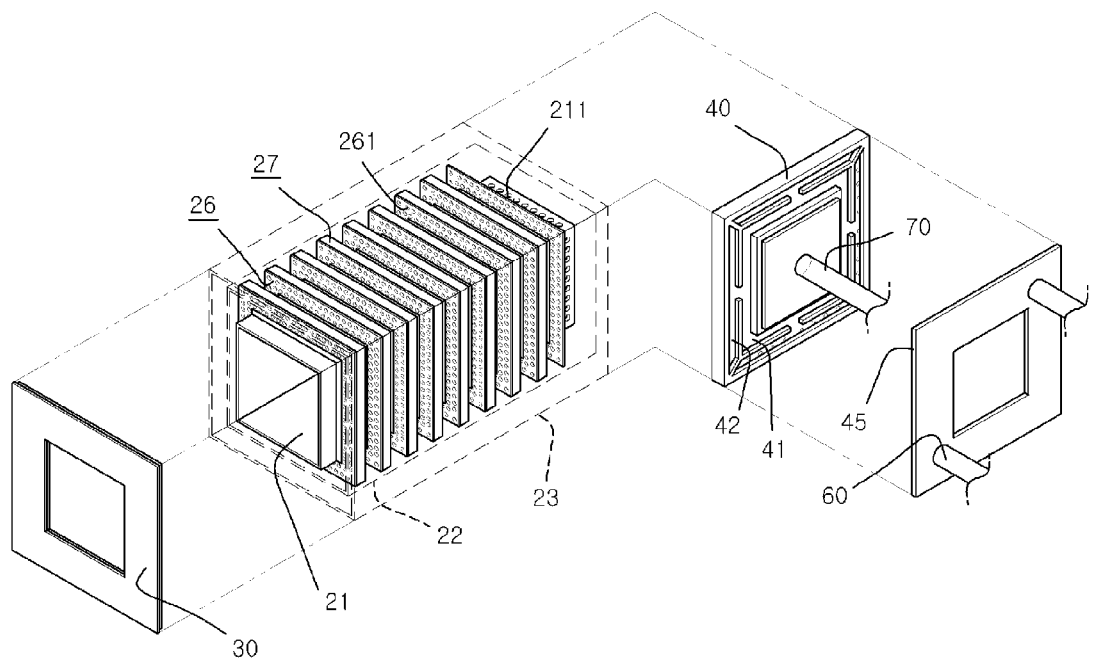
Figure 3:
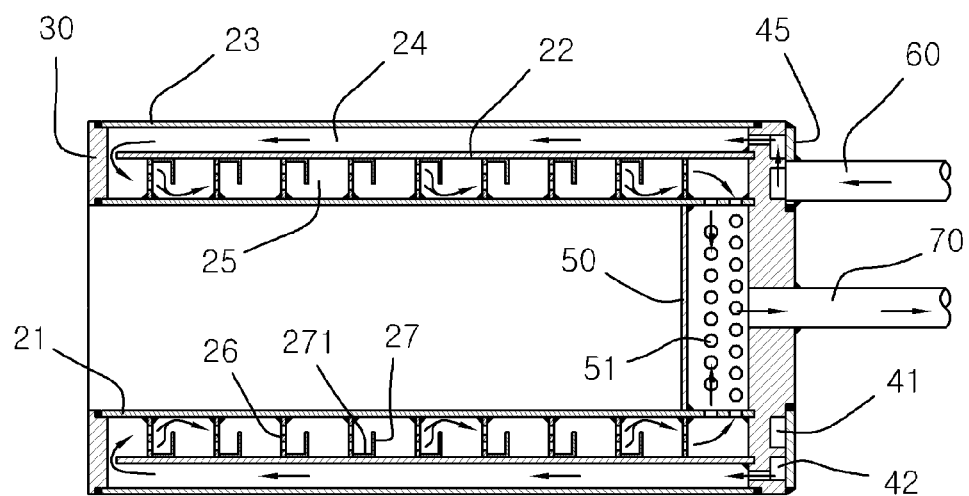
FIG. 3 is a sectional view of an open-type solar heat absorber having a dual passage according to an embodiment of the present invention.

FIGS. 1A, 1B, and 2 are perspective exploded views illustrating an open-type solar heat absorber having a dual passage according to an embodiment of the present invention. FIG. 3 is a sectional view of an open-type solar heat absorber having a dual passage according to an embodiment of the present invention.

A tower-type solar heat power generation system includes a plurality of heliostats for reflecting sunlight to collect the sunlight, a plurality of receivers arrayed in a part, onto which the sunlight is focused by the heliostats, to heat a heat transfer medium transferring into an inner passage, a steam generator for generating steam by using the heat transfer medium heated in the receiver, and a generator for generating electricity by using the steam generated from the steam generator.

A dual-passage open-type solar heat absorber 10 according to the present invention, which is used for the tower-type solar heat power generation system, includes a side wall 20 which is formed with a three-layered tube having an inner tube 21, an intermediate tube 22 and an outer tube 23 which have a rectangular or circular shape and overlap each other. The inner, intermediate and outer tubes of the three-layered tube have mutually different inner diameters which are narrowed in a sequence of inner, intermediate and outer tubes, and overlap each other on the same axis, so that the side surfaces of the tubes are spaced apart from each other, thereby forming an outer passage 24 and an inner passage. In addition, the inner tube 21 includes a plurality of through-holes 211 formed on a side surface of a rear end thereof, such that the inner passage 25 and a collection space 51, which will be described later, may communicate with each other. The intermediate tube 22 of the three-layered tube has a front end placed rearward of the inner and outer tubes, thereby forming a space where the inner and outer passages communicate with each other.

A front finish plate 30 is coupled to a front end of the side wall. The front finish plate 30 is formed in a shape of a rectangular or circular strip plate and is coupled to ends of the inner and outer tubes 21 and 23, such that the two tubes are connected to each other thereby to close the end of the side wall. Thus, the heating by means of collecting sunlight is implemented through the front finish plate and an inner side surface of the inner tube.

A rear finish plate 40 having a plate shape is coupled to a rear end of the side wall, such that the entire rear end of the side wall is closed. The rear finish plate is provided with grooves 41 and 42, so that the rear finish plate may be further coupled to a finish cap 45, and the details will be described below.

An inner finish plate 50 for closing the inner space of the inner tube 21 is coupled to an inner side portion of the inner tube 21 spaced apart from the rear finish plate 40 toward the front end side by a predetermined interval. The outer surface of the inner finish plate 50 is coupled to an inner surface of the inner tube 21 through a coupling scheme such as a sealing scheme using a welding or high-temperature endurable material, or a bracket packing scheme, so that the inner tube 21 is sealed and the inner finish plate 50 is fixed to the inner surface of the inner tube 21.

When the rear finish plate 40 is installed while being spaced apart from the inner finish plate 50, the dust collection space 51 is formed between the rear finish plate 40 and the inner finish plate 50. The through-holes 211 are provided on the surface of the inner tube corresponding to a part in which the collection space is formed, so that the inner passage 25 communicates with the collection space 51.

An inlet tube 60 is coupled to the rear finish plate 40. The inlet tube is provided to introduce the heat exchange medium into the receiver. Air or water may be used as the heat exchange medium, and the embodiment will be described with air as one example. Thus, the inlet tube is provided to introduce air as the heat exchange medium into the receiver.

Next, an outlet tube 70 is further coupled to the rear finish plate 40. The outlet tube is coupled to the rear finish plate 40 to communicate with the collection space 51, such that the heat-exchange completed air is discharged through the outlet tube. The air discharged through the outlet tube is again supplied into the inlet tube after steam is generated from the steam generator through the heat exchange, so that the air may be circulated without being discharged.

A plurality of porous plates 26 may be installed in the inner passage 25 of the solar heat absorber having the structure described above.

The porous plate 26 is provided with a plurality of through-holes 261 which are formed in a rectangular or circular strip shape on an inner surface thereof and firmly coupled to a periphery surface of the inner tube. Of course, although the porous plate 26 is enabled to be coupled to an inner surface of the intermediate tube 22, in order to easily install the porous plate 26, after the porous plate is installed to the periphery surface of the inner tube, it is preferable to insert the inner tube, to which the porous plate is installed, into the intermediate tube.

The porous plate 26 is formed in perpendicular to a moving path of air as the heat exchange medium, so that the air passes through the through-holes 261 after crashing to the porous plate. Thus, the contact area with the air is increased so that the heat exchange is easily performed. The light collection heating is performed in the inner surface of the inner tube 21 so that the inner tube is heated to a high temperature. The solar heat transfers to the porous plate 26 as well as the inner tube 21 so that the porous plate is heated. In this case, the porous plate makes a heat exchange with the air crashing to the porous plate or passing through the through-holes of the porous plate, so that the air is heated.

In addition, a baffle 27 may be further installed to the inner passage 25 of the solar heat absorber. The baffle 27 is coupled to one of an outer wall surface of the inner tube 21, an inner wall surface of the intermediate tube 22, and one end of the porous plate 26 to allow air as a heat-exchange medium to transfer over the baffle 27, so that a length of the moving path of air is increased. When the moving path is lengthened, it takes much time to pass through the inner passage, so the heat-exchange time may be increased. In this case, as shown in the drawings, when the baffle is coupled to the porous plate, an interval maintaining part 271 is preferably formed from an end of the porous plate in an axis direction, so that surfaces of the porous plate and the baffle are spaced apart from each other by a constant interval. As described above, when the porous plate and the baffle are installed together, the air passing through one porous plate again passes through another porous plate over the baffle, so that the moving path of the air may twist and the contact area of the air with the inner tube, the porous plate and the baffle, from which heat is radiated, may be increased.

Figure 4:
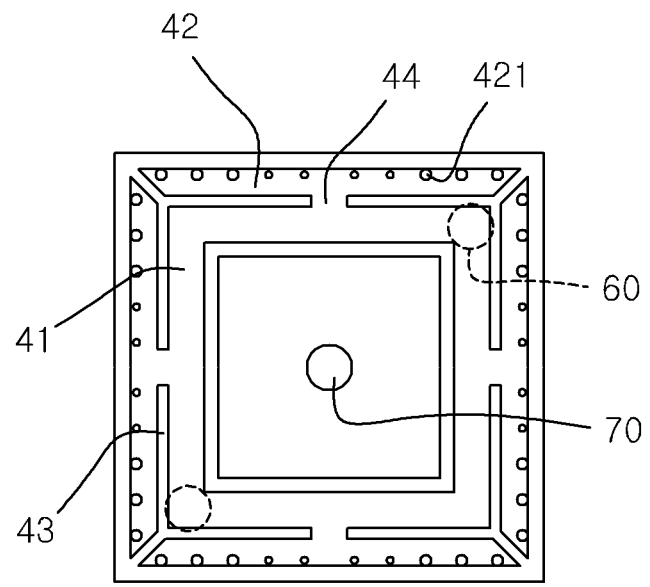
FIG. 4 is a plan view showing a rear finish plate according to an embodiment of the present invention.
Figure 5:
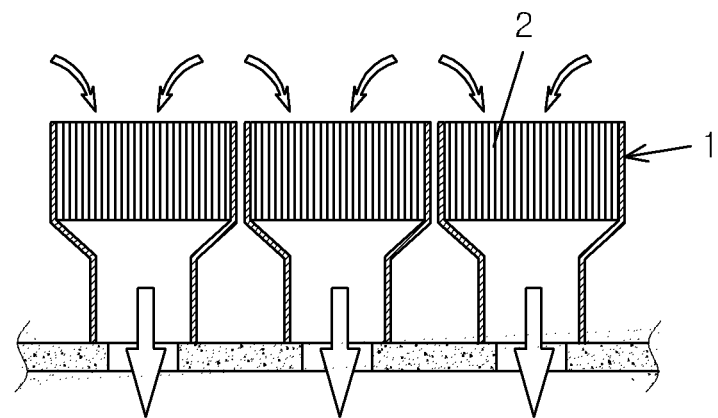
FIG. 5 is a schematic view showing an absorber according to the prior art.

Meanwhile, as shown in FIGS. 2 to 4, the rear finish plate 40 may include inner grooves 42 and 41 which are two-raw grooves formed along an edge of a surface which is exposed to an outside.

In addition, the inner and outer side walls of an edge of the outer groove 42 are connected to each other, so that the passage is blocked by the groove and a moving hole 44 connecting the outer groove and the inner groove is formed between the outer groove and the inner groove.

Further, a plurality of outer groove through-holes 421 is formed on a lower surface of the outer groove 42, so that the outer groove 42 communicates with the outer passage 24. A finish cap 45 having a rectangular or circular strip shape is coupled to the opened surfaces of the outer and inner grooves, so that the inner space is closed.

The finish cap 45 is provided with the inlet tube 60 installed to a part of an edge of the inner groove 41 to allow the inner and outer grooves 41 and 42 to communicate with each other, so that the air as the heat-exchange medium provided into the inlet tube 60 sequentially transfers to the inner and outer grooves 41 and 42, and then, the air is supplied into the outer passage through the outer groove through holes 421.

Preferably, the outer and inner grooves 42 and 41 are formed on the same axis line as the inner and outer passages 25 and 24. Since the rear finish plate making contact with the inner passage receives heat through the inner passage and is heated, the air supplied into the inlet tube is allowed to pass through a part adjacent to the rear finish plate making contact with the inner passage, such that the heat is recovered.

In order to recover the heat radiated from the inner passage, the air supplied through the inlet tube is allowed to first pass through the outer passage and then, to be supplied into the inner passage by forming the outer passage 24 outside the inner passage 25. That is, the air heated through the inner passage 25 heats the intermediate tube 22 and the heat radiated to an outside through the intermediate tube is recovered with the low-temperature air passing through the outer passage 24, so that the preheated air passes through the inner passage 25. Thus, the air, which serves as the heat-exchange medium, is heated after being preheated, so that the heat-exchange efficiency may be maximized.

Hereinafter, a state of operating the dual-passage open-type solar heat absorber according to the present invention will be described in brief.

The plurality of absorbers 10 are installed to a part on which light is collected by the heliostats. Since the absorbers are formed in a structure having a cross section having one selected from rectangular and circular shapes, one absorber is installed to be close to another absorber without any gaps therebetween, so that all collected solar heat may be converted into thermal energy. Sunlight is concentrated onto the front finish plate 30 and the inner surfaces of the inner tube 21 in the absorber, so that the heating is performed.

In the heating state, when air, which serves as the heat-exchange medium, is introduced through the inlet tube 60, the air transfers to the outer groove 42 through the moving hole 44 while moving along the inner groove 41 of the rear finish plate 40.

The air transferred into the outer groove passes through the rear finish plate 40 through the outer groove through holes 421 formed in the outer groove, so that the air is introduced into the outer passage 24 between the outer and intermediate tubes 23 and 22 and then, transfers to a front of the absorber.

The air moving into the outer passage 24 transfers from the front of the absorber to the inner passage 25, so that the heat exchange is performed while the air makes contact with the front finish plate 30 during this air flowing process.

The air introduced into the inner passage 25 makes contact with the surface of the inner tube 21 while moving toward the rear finish plate, so that the heat exchange is performed. In addition, the plurality of porous plates 26 and baffles 27 are installed in the inner passage, the air moves over the baffles and zigzags in a width direction of the inner passage after passing through the through-holes 261 of the porous plates, so that the traveling distance of the air is increased. In addition, even when the air makes contact with the porous plates and the baffles, the heat exchange is performed so that the air is heated. In this case, since the heat exhausted into the outer passage through the intermediate tube forming the inner passage is absorbed by the air transferring into the outer passage, the air in the outer passage is preheated while heat leakage is blocked, so that the heat exchange is easily performed in the inner passage.

The heated air moving into the inner passage is introduced into the collection space 51 through the through-holes 211 formed on the rear end of the inner tube 21 and then, is discharged to an outside of the absorber through the outlet tube communicating with the collection space.

INDUSTRIAL APPLICABILITY

As described above, a dual-passage open-type solar heat absorber having a porous plate array according to the present invention, which is used for a tower-type solar heat generation system, is formed in a form of a container having a rectangular or circular-shape in order to improve expandability in a lateral direction. In addition, the dual-passage open-type solar heat absorber includes a wall surface having a dual-layered dual passage formed by using a three-layered tube in order to allow a heat-exchange medium to be introduced into a lower passage to make a heat exchange after the heat-exchange medium is primarily introduced into an upper passage to form a heat blocking curtain, such that heat loss through the side wall is minimized.

The invention claimed is:
1. A dual-passage solar heat absorbing system comprising:
a porous plate array;
an absorber for absorbing a solar energy from solar heat using heliostat collectors;

a heat-exchange medium in the absorber being heated by the solar energy; wherein the heated heat-exchange medium generates steam for generating electricity;

the absorber comprising:
- a side wall formed with a three-layered tube having, an inner tube having an inner side surface and an outer side surface, an intermediate tube having an inner side surface and an outer side surface and an outer tube having an inner side surface and an outer side surface, said inner, intermediate and outer tubes having a rectangular or circular shape and overlapping each other,
- wherein the outer side surface of the inner tube and the inner side surface of the intermediate tube are spaced apart from each other to form an inner passage, the outer side surface of the intermediate tube and the inner side surface of the outer tube are spaced apart from each other to form an outer passage, and the inner and outer passages communicate with each other through front ends thereof;
- a plurality of through-holes formed in a side surface of a rear portion of the inner tube;
- a front finish plate disposed at a front end of the side wall and coupled to ends of the inner and outer tubes to close a front end of the three-layered tube;
- a rear finish plate for closing a rear end of the side wall;
- an inner finish plate for closing an inside of the inner tube at a position spaced to the front finish plate from the rear finish plate by a predetermined distance;
- a collection space formed between the inner finish plate and the rear finish plate, such that the inner passage and the collection space communicate to transmit the heat-exchange medium, wherein the plurality of through-holes formed in the side surface of the rear portion of the inner tube are disposed in the collection space;
- an inlet tube coupled to the rear finish plate to communicate with the outer passage to transmit the heat-exchange medium; and an outlet tube coupled to the rear finish plate to communicate with the collection space.

2. The dual-passage solar heat absorbing system of claim 1, further comprising a plurality of porous plates installed in the inner passage, each of the plurality of porous plates including a plurality of through-holes, wherein a heat-exchange medium moving along the inner passage moves through the plurality of through-holes of the porous plates.

3. The dual-passage solar heat absorbing system of claim 2, further comprising a baffle protruding from one of an outer wall surface of the inner tube, an inner wall surface of the intermediate tube and an end of one of the plurality of porous plates in the inner passage, wherein the heat-exchange medium moving along the inner passage moves over the baffle so that a moving distance of the heat-exchange medium is increased.

4. The dual-passage solar heat absorbing system of claim 1, wherein the rear finish plate includes outer and inner grooves each of the grooves having two-rows formed along an edge of a rear surface of the rear finish plate, which is exposed to an outside,
- the outer groove has two side walls each of the side wall disposed at respective side edges to define the outer groove,
- a moving hole is formed in an inner wall between the outer and inner grooves to allow the outer and inner grooves to communicate with each other,
- a plurality of outer groove through-holes are formed in a lower surface of the outer groove,
- a finish cap is coupled to opened surfaces of the outer and inner grooves to close an inner space, and the finish cap is connected with the inlet tube installed at an edge of the inner groove to communicate with the inner groove.

* * * * *